United States Patent
Li et al.

(10) Patent No.: US 10,839,820 B2
(45) Date of Patent: Nov. 17, 2020

(54) VOICE PROCESSING METHOD, APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Chao Li, Beijing (CN); Weixin Zhu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 112 days.

(21) Appl. No.: 16/236,261

(22) Filed: Dec. 28, 2018

(65) Prior Publication Data

US 2019/0378529 A1    Dec. 12, 2019

(30) Foreign Application Priority Data

Jun. 11, 2018    (CN) .......................... 2018 1 0595783

(51) Int. Cl.
| | |
|---|---|
| G10L 21/0208 | (2013.01) |
| G06N 3/08 | (2006.01) |
| G10L 25/30 | (2013.01) |
| G10L 25/84 | (2013.01) |

(52) U.S. Cl.
CPC ............ *G10L 21/0208* (2013.01); *G06N 3/08* (2013.01); *G10L 25/30* (2013.01); *G10L 25/84* (2013.01)

(58) Field of Classification Search
USPC .................. 704/231–233, 246, 247, 251, 252
See application file for complete search history.

(56) References Cited

U.S. PATENT DOCUMENTS

| | | | |
|---|---|---|---|
| 7,756,707 B2 | 7/2010 | Garner | |
| 9,997,172 B2 | 6/2018 | Barreda | |
| 10,553,236 B1* | 2/2020 | Ayrapetian | ........... G10K 11/178 |
| 2006/0031066 A1* | 2/2006 | Hetherington | ...... G10L 21/0208 |
| | | | 704/226 |

(Continued)

FOREIGN PATENT DOCUMENTS

| | | |
|---|---|---|
| CN | 10162102456351 A | 1/2010 |
| CN | 102157156 A | 8/2011 |
| CN | 102456351 A | 5/2012 |

(Continued)

OTHER PUBLICATIONS

The Chinese First Examination Report of corresponding Chinese application No. 201810595783.0, dated Apr. 24, 2019.

(Continued)

*Primary Examiner* — Leonard Saint Cyr
(74) *Attorney, Agent, or Firm* — J.C. Patents

(57) ABSTRACT

The present application provides a voice processing method, an apparatus, a device, and a storage medium, including: acquiring a first acoustic feature of each of N voice frames, where N is a positive integer greater than 1; applying a neural network algorithm to N first acoustic features to obtain a first mask; modifying the first mask according to VAD information of the N voice frames to obtain a second mask; and processing the N first acoustic features according to the second mask to obtain a second acoustic feature, resulting in more effective noise suppression and a lower damage to the voice.

12 Claims, 5 Drawing Sheets

(56) References Cited

U.S. PATENT DOCUMENTS

2016/0234356 A1\* 8/2016 Thomas .............. H05K 9/0069
2018/0277134 A1\* 9/2018 Goodwin ............. G10L 19/012

FOREIGN PATENT DOCUMENTS

| | | |
|---|---|---|
| CN | 102708855 A | 10/2012 |
| CN | 103280225 A | 9/2013 |
| CN | 103325388 A | 9/2013 |
| CN | 103778920 A | 5/2014 |
| CN | 105261375 A | 1/2016 |
| CN | 106683661 A | 5/2017 |
| CN | 107845389 A | 3/2018 |
| JP | 2006126859 A | 5/2006 |
| JP | 2008129077 A | 6/2008 |
| JP | 2010204392 A | 9/2010 |
| JP | 2017191332 A | 10/2017 |
| JP | 2018031967 A | 3/2018 |
| WO | 2010089976 A | 8/2010 |

OTHER PUBLICATIONS

Notice of Allowance of counterpart Chinese application, dated Apr. 24, 2019.
Notice of Rejection of counterpart Japan application, dated Feb. 25, 2020.
Applications of Empirical Mode Decomposition in Vibration Analysis, published on Nov. 2013.
Evaluation of DNN-based Low-Musical-Nosie Speech Enhancement Using Kurtosis Matching.

\* cited by examiner

VOICE PROCESSING METHOD, APPARATUS, DEVICE AND STORAGE MEDIUM

CROSS-REFERENCE TO RELATED APPLICATIONS

This application claims priority to Chinese Patent Application No. 201810595783.0, filed on Jun. 11, 2018, which is hereby incorporated by reference in its entirety.

TECHNICAL FIELD

The present application relates to the field of voice processing technologies and, in particular, to a voice processing method, an apparatus, a device, and a storage medium.

BACKGROUND

In a low-noise situation, the human auditory system can identify the sound of interest in a noisy environment. This phenomenon is called the "cocktail party effect", which is often technically described as a blind source separation problem, that is, to separate a foreground sound of interest from a noisy background sound in the absence of a reference signal.

The main technical means for blind source separation is mask estimation and to process an acoustic feature via the mask. The neural network algorithm is currently used to estimate the mask. For example, the mask is estimated with $$\mathrm{mask}(t, f) = \sqrt{\frac{\sigma_x^2(t, f)}{\sigma_y^2(t, f)}}$$

for the characteristic of the amplitude spectrum of Fast Fourier Transform (FFT) of voice, where t represents the $t\text{-}^{th}$ voice frame, f represents the $f\text{-}^{th}$ frequency point, $\sigma_x^2(t, f)$ represents power of a clean voice at the time-frequency point (t, f), and $\sigma_y^2(t, f)$ represents power of a noisy voice at the time-frequency point (t, f). However, in practice, the clean voice still carries noise. As a result, the estimated mask is not accurate enough, which in turn results in a poor voice processing effect.

SUMMARY

In order to solve the above technical problem, the present application provides a voice processing method, an apparatus, a device, and a storage medium, where a mask is modified according to voice activity detection (VAD) information, thereby eliminating a large number of discrete masks, resulting in a more effective noise suppression effect and a lower damage to the voice.

In a first aspect, the present application provides a voice processing method, including: acquiring a first acoustic feature of each of N voice frames, where N is a positive integer greater than 1; applying a neural network algorithm to N first acoustic features to obtain a first mask; modifying the first mask according to voice activity detection (VAD) information of the N voice frames to obtain a second mask; and processing the N first acoustic features according to the second mask to obtain a second acoustic feature.

The present application is beneficial in that: a mask is modified according to VAD information, which eliminates a large number of discrete masks, and an acoustic feature is processed with the modified mask, which may improve the effectiveness of noise suppression and lower the damage to the voice.

Optionally, the modifying the first mask according to the VAD information of the N voice frames includes: calculating a product of the VAD information and the first mask to obtain the second mask. The first mask may be effectively modified with this method.

Optionally, the VAD information includes: a VAD value corresponding to each of the voice frames. When the N voice frames include a silence frame, set a VAD value corresponding to the silence frame to zero. The VAD information may be determined to modify the first mask with this method.

Optionally, the VAD information includes a VAD value corresponding to each of the voice frames. Correspondingly, before the modifying the first mask according to VAD information of the N voice frames, the method further includes: determining M1 voice frames having a VAD value of 1 and P1 voice frames having a VAD value of 0 from the N voice frames, where the M1 voice frames are adjacent to the P1 voice frames, and where M1 and P1 are positive integers greater than 1; smoothing the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, where the M2 voice frames are adjacent to the P2 voice frames, and where 1≤M2≤M1, 1≤P2≤P1. The VAD information may be determined to modify the first mask with this method.

Optionally, the determining the M1 voice frames having the VAD value of 1 and the P1 voice frames having the VAD value of 0 from the N voice frames includes: determining a call type corresponding to each of the N voice frames, where the type includes silence and phone; determining a voice frame having the silence type as a voice frame having the VAD value of 0; and determining a voice frame having the phone type as a voice frame having the VAD value of 1.

Optionally, M2 and P2 are determined by a hamming window, a triangular window or a hanning window.

A voice processing apparatus, device, a storage medium and a computer program product will be provided below, for effects thereof, reference may be made to the effects in the above description of the method, and details will not be described herein.

In a second aspect, the present application provides a voice processing apparatus, including:

an acquiring module, configured to acquire a first acoustic feature of each of N voice frames, where N is a positive integer greater than 1;

a training module, configured to apply a neural network algorithm to N first acoustic features to obtain a first mask;

a modification module, configured to modify the first mask according to voice activity detection (VAD) information of the N voice frames to obtain a second mask; and a first processing module, configured to process the N first acoustic features according to the second mask to obtain a second acoustic feature.

Optionally, the modification module is specifically configured to calculate a product of the VAD information and the first mask to obtain the second mask.

Optionally, the VAD information includes: a VAD value corresponding to each of the voice frames. Correspondingly, the apparatus further includes: a setting module, configured to, when the N voice frames include a silence frame, set a VAD value corresponding to the silence frame to zero.

Optionally, the VAD information includes a VAD value corresponding to each of the voice frames. Correspondingly, the apparatus further includes:

a determining module, configured to determine M1 voice frames having a VAD value of 1 and P1 voice frames having a VAD value of 0 from the N voice frames, where the M1 voice frames are adjacent to the P1 voice frames, and where M1 and P1 are positive integers greater than 1; and a second processing module, configured to smooth the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, where the M2 voice frames are adjacent to the P2 voice frames, and where 1≤M2≤M1, 1≤P2≤P1.

Optionally, the determining module is specifically configured to: determine a call type corresponding to each of the N voice frames, where the type includes silence and phone; determine a voice frame having the silence type as a voice frame having the VAD value of 0; and determine a voice frame having the phone type as a voice frame having the VAD value of 1.

Optionally, M2 and P2 are determined by a hamming window, a triangular window or a hanning window.

In a third aspect, the present application provides a voice processing device, including: a memory and a processor.

The memory is configured to store instructions executed by the processor, such that the processor performs the voice processing method according to the first aspect or any optional manner of the first aspect.

In a fourth aspect, the present application provides a storage medium, including computer executable instructions for implementing the voice processing method according to the first aspect or any optional manner of the first aspect.

In a fifth aspect, the present application provides a computer program product including: computer executable instructions for implementing the voice processing method according to the first aspect or any optional manner of the first aspect.

The present application provides a voice processing method, an apparatus, a device, and a storage medium, including: acquiring a first acoustic feature of each of N voice frames, where N is a positive integer greater than 1; applying a neural network algorithm to N first acoustic features to obtain a first mask; modifying the first mask according to VAD information of the N voice frames to obtain a second mask; and processing the N first acoustic features according to the second mask to obtain a second acoustic feature. A mask is modified according to VAD information, which eliminates a large number of discrete masks; and an acoustic feature is processed with the modified mask, which may improve the effectiveness of noise suppression and lower the damage to the voice.

DESCRIPTION OF EMBODIMENTS

Figure 1:
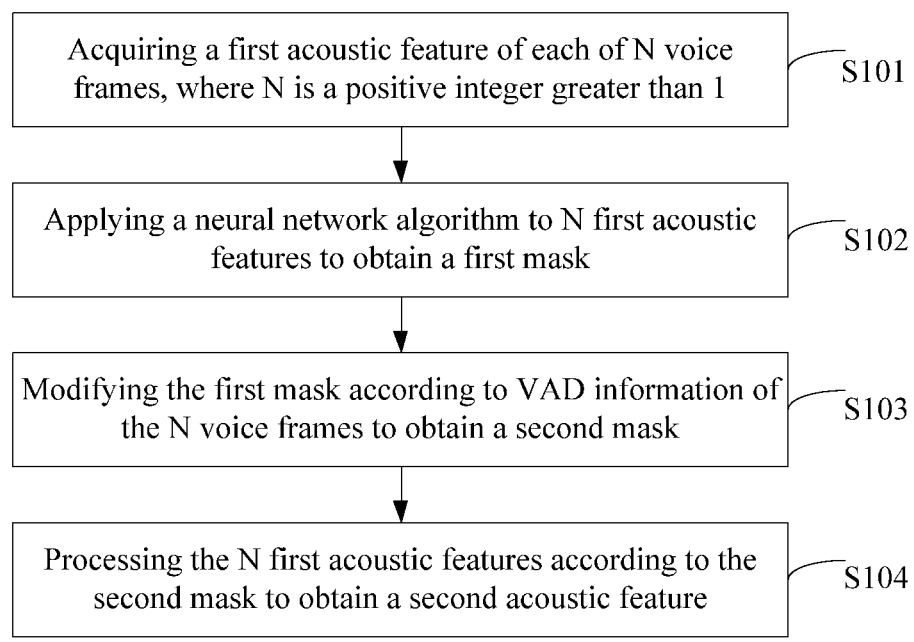
FIG. 1 is a flowchart of a voice processing method according to an embodiment of the present application.

As noted above, the cocktail party effect is often technically described as a blind source separation problem, that is, to separate a foreground sound of interest from a noisy background sound in the absence of a reference signal.

Blind source separation can be applied to the following scenarios:

Scenario 1: Extract the voice of a target speaker from the voice of multiple speakers. For example, a user is attempting to interact with a smart audio device on the coffee table, when the news is broadcast on the TV in the living room. The audio device would receive both the user's voice request and the news broadcast from the host. That is to say, there are two people speaking at the same time.

Scenario 2: Separate the voice from background noise. For example, when the driver is driving, the microphone of the car or mobile phone would receive various noises, such as wind noise, road noise, whistles, etc. Blind source separation can suppress these environmental noises and only extract the driver's voice.

Blind source separation is actually a regression model. If the performance of the model is not ideal, the following flaws will appear:

1. Background sounds are not eliminated. That is to say, the blind source separation is poor in terms of noise cancellation, and the performance of noise suppression is low.

2. The target voice is also cancelled. That is to say, not only noises, but also the target voice is suppressed by the blind source separation.

3. The noises are not completely cancelled and the target voice is damaged. Such situation is most common, that is, noises still exist at some time-frequency points, while the target voice is cancelled at some other time-frequency points.

Accordingly, the two key technologies for blind source separation are noise suppression and no damage to the target voice. A good blind source separation should be able to suppress a background noise to the most extent with minimal damage to the target voice.

The key to blind source separation is mask calculation. In the prior art, for an acoustic feature of each voice frame, a neural network is used to predict an output vector between 0 and 1, where the output vector is a mask.

The acoustic feature described above may be an amplitude spectrum of the FFT, Mel-frequency Cepstrum Coefficients (MFCC), a Mel-scale Filter Bank (FBank), Perceptual Linear Predictive (PLP), or the like.

For example, for the feature of the amplitude spectrum of the FFT of voice, the mask is estimated by $$\text{mask}(t, f) = \sqrt{\frac{\sigma_x^2(t, f)}{\sigma_y^2(t, f)}},$$

where t represents the t-$^{th}$ voice frame and f represents the f-$^{th}$ frequency point, $\sigma_x^2(t, f)$ represents power of a clean voice at the time-frequency point (t, f), $\sigma_y^2(t, f)$ represents power of a noisy voice at the time-frequency point (t, f).

However, in practice, the clean voice still carries noise. As a result, the estimated mask is not accurate enough, which in turn results in a poor voice processing effect.

In order to solve the technical problem, the present application provides a voice processing method, an apparatus, a device, and a storage medium. The technical solution of the present application is applied to, but not limited to, the application scenarios of the blind source separation described above. Specifically, FIG. 1 is a flowchart of a voice processing method according to an embodiment of the present application. The executive agent for the method may be a part of or the entire smart terminal, such as a computer, a mobile phone, or a notebook computer. The method will be described hereunder by taking the computer as the executive agent for the method. As shown in FIG. 1, the voice processing method includes the following steps:

Step S101: acquiring a first acoustic feature of each of N voice frames, where N is a positive integer greater than 1;

Step S102: applying a neural network algorithm to N first acoustic features to obtain a first mask;

Step S103: modifying the first mask according to VAD information of the N voice frames to obtain a second mask; and Step S104: processing the N first acoustic features according to the second mask to obtain a second acoustic feature.

The description of Step S101 is as follows:

The first acoustic feature may be any one of an amplitude spectrum of the FFT, MFCC, FBank or PLP, which is not limited in the present application. Actually, the first acoustic feature of each of the N voice frames constitutes a first acoustic feature vector, where the vector includes N elements, each of which is the first acoustic feature corresponding to each of the N voice frames respectively.

The description of Step S102 is as follows:

It should be noted that the neural network algorithm involved in the present application is a neural network algorithm used in the prior art for mask calculation, which is not limited in this application.

Further, as described above, the neural network algorithm is applied to the N first acoustic features to obtain a first mask, where the first mask is a vector including N components, and the N components are respectively corresponding to the N first acoustic features, with each of the N components has a value range of [0, 1].

The description of Step S103 is as follows:

VAD is also known as speech endpoint detection, speech edge detection, etc. It refers to detecting the presence of voice in a noisy environment. It is usually used in voice processing systems such as voice coding and voice enhancement to reduce the voice coding rate, save communication bandwidth, reduce energy consumption of mobile devices, and improve identification rate.

The VAD involved in the present application may be preset or may be determined according to a call type of a voice frame, where the type may be silence or phone.

The method of determining the VAD according to the call type of the voice frame is as follows:

Alternatively, the VAD information includes: a VAD value corresponding to each of the N voice frames; when the N voice frames include a silence frame, setting the VAD value corresponding to the silence frame to 0, and on the contrary, when the N voice frames include a phone frame, setting the VAD value corresponding to the phone frame to be greater than 0 but less than or equal to 1. The so-called "silence frame" refers to a voice frame with a silence type. The so-called "phone frame" refers to a voice frame with a phone type.

Alternatively, the modifying the first mask according to the VAD information of the N voice frames includes: calculating a product of the VAD information and the first mask to obtain a second mask, or calculating a product of the VAD information, the first mask, and a preset coefficient to obtain a second mask. This application does not limit how to obtain the second mask. The second mask is also a vector including N components, and the N components are respectively corresponding to the N first acoustic features, with each of the N components has a value range of [0, 1]. The preset coefficient may be greater than 0 but less than or equal to 1.

Accordingly, when a VAD value is 0, a component of the corresponding second mask is also 0. In the present application, this modification is referred to as a hard modification approach.

Figure 2:
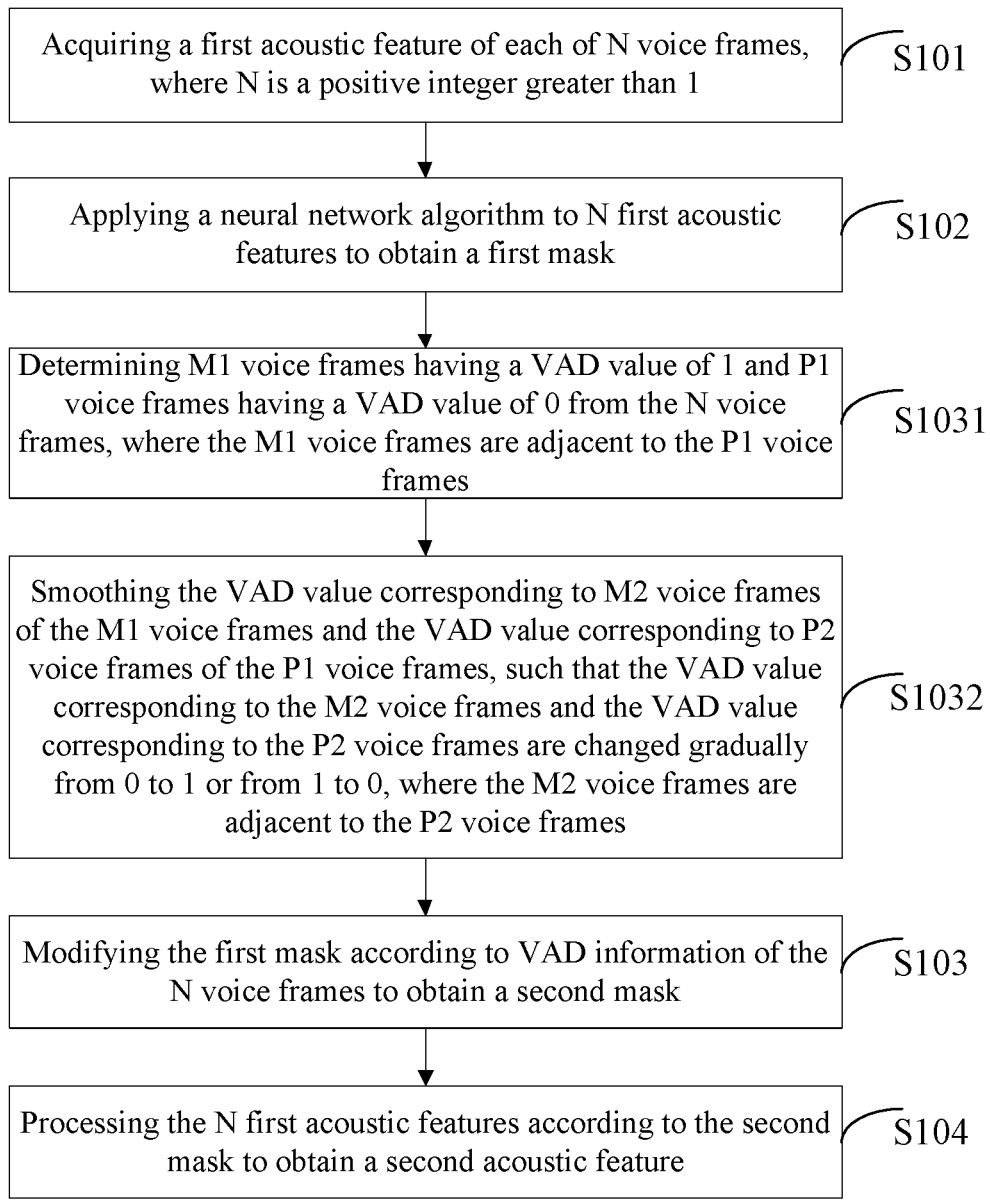
FIG. 2 is a flowchart of a voice processing method according to another embodiment of the present application.

Optionally, the VAD information includes a VAD value corresponding to each of the N voice frames. Correspondingly, FIG. 2 is a flowchart of a voice processing method according to another embodiment of the present application. As shown in FIG. 2, before Step S103, the voice processing method further includes:

Step S1031: determining M1 voice frames having a VAD value of 1 and P1 voice frames having a VAD value of 0 from the N voice frames, where the M1 voice frames are adjacent to the P1 voice frames; and Step S1032: smoothing the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, where the M2 voice frames are adjacent to the P2 voice frames.

Step S1031 is described as follows: where both M1 and P1 are positive integers greater than 1, and M1+P1=N. Specifically, first, determining a call type corresponding to each of the N voice frames, where the type includes silence and phone; determining a voice frame having the silence type as a voice frame having the VAD value of 0; and determining a voice frame having the phone type as a voice frame having the VAD value of 1.

In this application, a "forced alignment" approach may be used to determine a call type corresponding to each of the N voice frames. The so-called "forced alignment" refers to determining the start and end time of each type, for example, which voice frame or voice frames are corresponding to a certain type. For instance, first M1 voice frames of the N voice frames are forcibly aligned to the silence type, and P1 voice frames following the M1 voice frames are forcibly aligned to the phone type. It should be noted that it is merely an example that the first M1 voice frames of the N voice frames are forcibly aligned to the silence type and the P1 voice frames following the M1 voice frames are forcibly aligned to the phone type. In fact, the N voice frames are sequentially composed of N1 voice frames having the silence type, N2 voice frames having the phone type, N3 voice frames having the silence type, . . . Nn voice frames having the phone type, where N1+N2+ . . . Nn=N, and N1, N2, . . . , Nn are all integers greater than or equal to 0, which is not limited in the present application.

Figure 3:
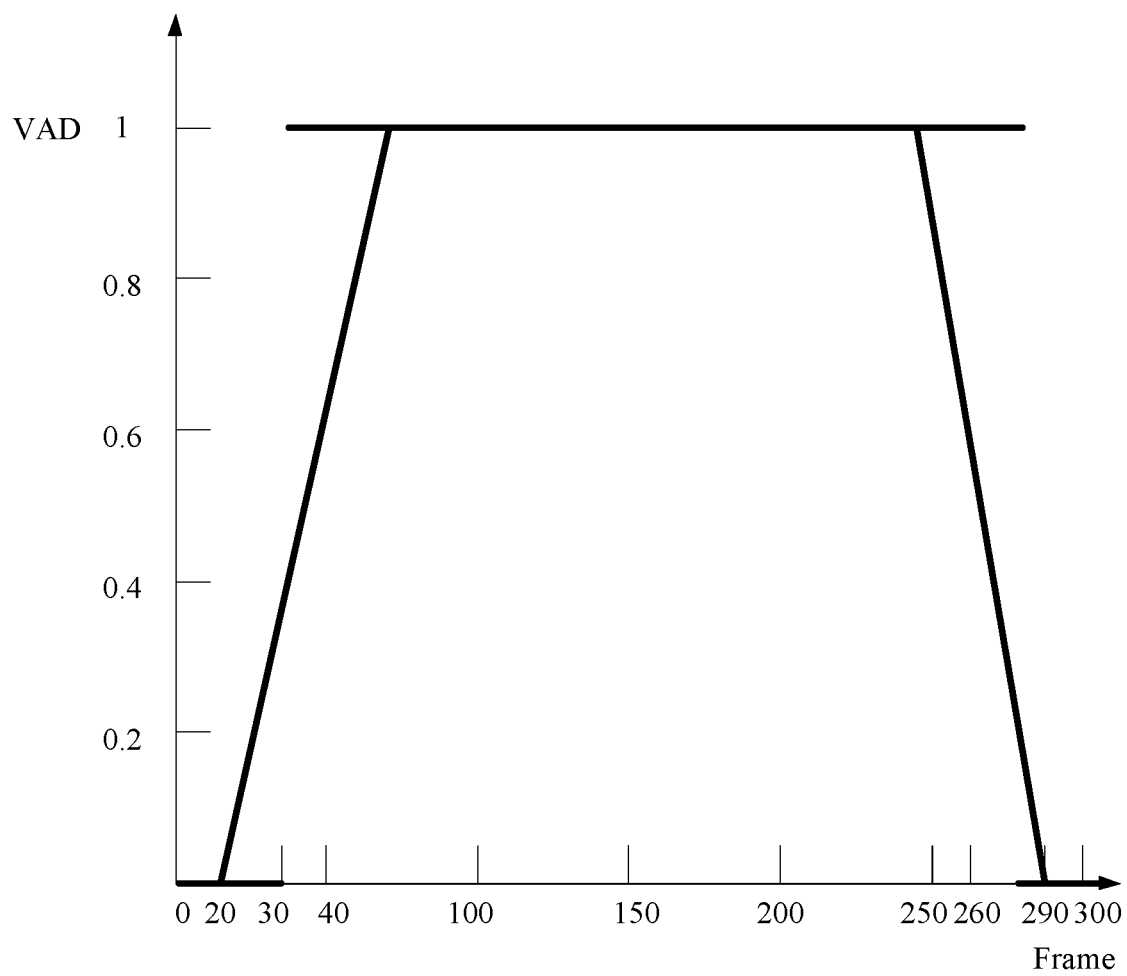
FIG. 3 is a schematic diagram of smoothing a VAD value according to an embodiment of the present application.

Step S1032 is described as follows: 1≤M2≤M1, 1≤P2≤P1, optionally, M2 and P2 are determined by a hamming window, a triangular window or a hanning window. Preferably, M2+P2=10. FIG. 3 is a schematic diagram of smoothing a VAD value according to an embodiment of the present application. As shown in FIG. 3, the $0^{th}$ voice frame to the $30^{th}$ voice frame are silence frames, that is, their respective VAD values are 0; the $31^{st}$ voice frame to the $280^{th}$ voice frame are phone frames, that is, their respective VAD values are 1; and the $281^{th}$ voice frame to the $300^{th}$ voice frame are silence frames again, that is, their respective VAD values are 0. The following is a smoothing process performed on voice frames from the $20^{th}$ voice frame to the $40^{th}$ voice frame, which may specifically include: determining the corresponding point coordinate (20, 0) of the 20th voice frame and the corresponding point coordinate (40, 1) of the $40^{th}$ voice frame, and determining a straight line according to the two points, where the straight line is a result of the smoothing process on the voice frames from the $20^{th}$ voice frame to the $40^{th}$ voice frame. Accordingly, for the voice frames from the $20^{th}$ voice frame to the $40^{th}$ voice frame, their VAD values are gradually changed from 0 to 1. Similarly, a smoothing process is performed on voice frames from the $260^{th}$ voice frame to the $290^{th}$ voice frame, which may specifically include: determining the corresponding point coordinate (260, 1) of the $260^{th}$ voice frame and the corresponding point coordinate (290, 0) of the $290^{th}$ voice frame, and determining a straight line according to the two points, where the straight line is a result of the smoothing process on the voice frames from the $260^{th}$ voice frame to the $290^{th}$ voice frame. Accordingly, for the voice frames from the $260^{th}$ voice frame to the $290^{th}$ voice frame, their VAD values are gradually changed from 1 to 0.

In the present application, this alternative is referred to as a soft modification approach.

The description of Step S104 is as follows:

Alternatively, processing the N first acoustic features according to the second mask to obtain N second acoustic features. Assume that any of the second acoustic features is denoted as estimate, a first acoustic feature corresponding to the second acoustic feature is denoted as noise, and a component corresponding to the first acoustic feature of the second mask is denoted as h, then estimate=noise*h, where * represents the multiplication.

Alternatively, processing the N first acoustic features according to the second mask to obtain one second acoustic feature. Assume that the second acoustic feature is denoted as estimate, the N first acoustic features are denoted as noise(N), where noise(NN) is a vector consisting of the N first acoustic features, components corresponding to the first acoustic features of the second mask are denoted as h(N), then estimate=$(noise(N)*(h(N))^T$. Where * represents the product of the vectors and $(h(N))^T$ represents the transpose of h(N).

In view of the above, the present application provides a voice processing method. The key technology of the method is to modify a mask according to VAD information, thereby eliminating a large number of discrete masks, resulting in more effective noise suppression and a lower damage to voice.

Figure 4:
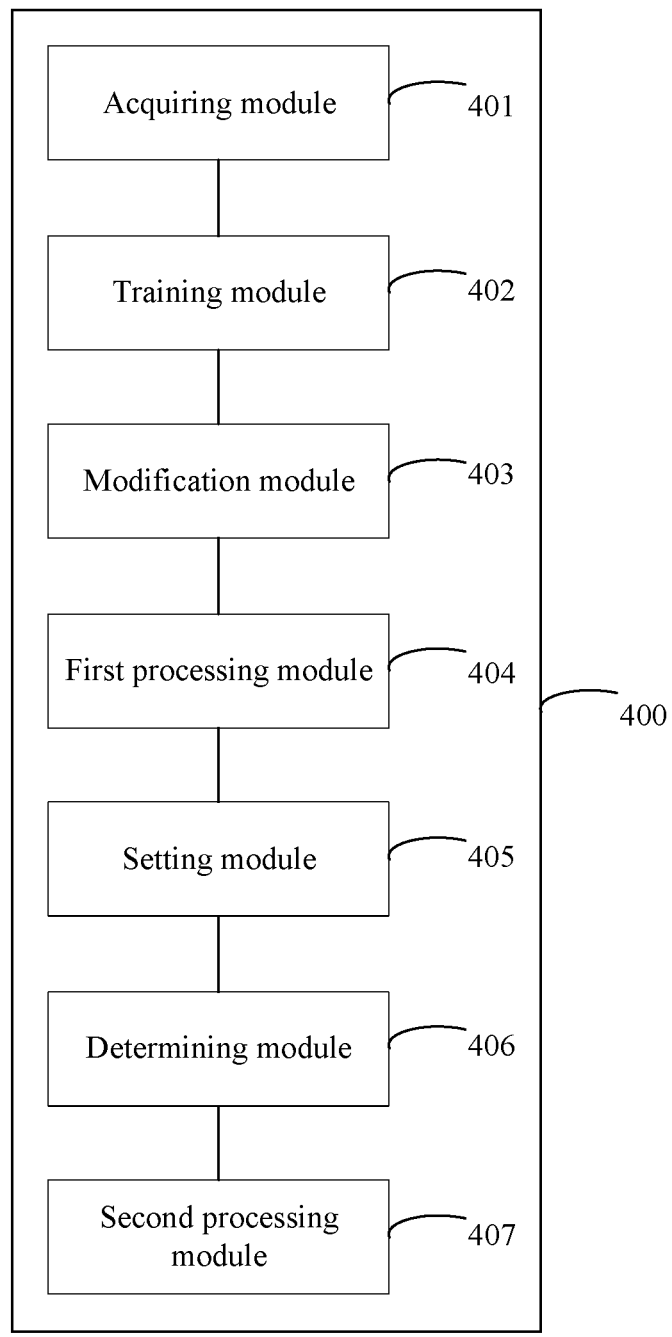
FIG. 4 is a schematic diagram of a voice processing apparatus 400 according to an embodiment of the present application.

FIG. 4 is a schematic diagram of a voice processing apparatus 400 according to an embodiment of the present application. As shown in FIG. 4, the voice processing apparatus may be a part of or the entire computer, tablet, or mobile phone. For example, the apparatus may be a computer or a processor or the like, where the apparatus includes:

an acquiring module 401, configured to acquire a first acoustic feature of each of N voice frames, where N is a positive integer greater than 1;

a training module 402, configured to apply a neural network algorithm to N first acoustic features acquired by the acquiring module 401 to obtain a first mask;

a modification module 403, configured to modify, according to VAD information of the N voice frames, the first mask obtained by the training module 402 to obtain a second mask; and a first processing module 404, configured to process the N first acoustic features according to the second mask obtained by the modification module 403 to obtain a second acoustic feature.

Optionally, the modification module 403 is configured to: calculate a product of the VAD information and the first mask to obtain the second mask.

Optionally, the VAD information includes: a VAD value corresponding to each of the voice frames. Correspondingly, the apparatus further includes:

a setting module 405, configured to, when the N voice frames include a silence frame, set a VAD value corresponding to the silence frame to 0.

Optionally, the VAD information includes: a VAD value corresponding to each of the voice frames.

Correspondingly, the apparatus further includes:

a determining module 406, configured to determine M1 voice frames having a VAD value of 1 and P1 voice frames having a VAD value of 0 from the N voice frames, where the M1 voice frames are adjacent to the P1 voice frames, and where M1 and P1 are positive integers greater than 1;

a second processing module 407, configured to smooth the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, where the M2 voice frames are adjacent to the P2 voice frames, and where $1 \le M2 \le M1$, $1 \le P2 \le P1$.

Optionally, the determining module 406 is specifically configured to: determine determining a call type corresponding to each of the N voice frames, where the type includes silence and phone; determine a voice frame having the silence type as a voice frame having the VAD value of 0; and determine a voice frame having the phone type as a voice frame having the VAD value of 1.

Optionally, M2 and P2 are determined by a hamming window, a triangular window or a hanning window.

The present application provides a voice processing apparatus, which can be used in the voice processing method described above. For contents and effects of the apparatus, reference may be made to the description of the method embodiment, which is not repeated herein.

Figure 5:
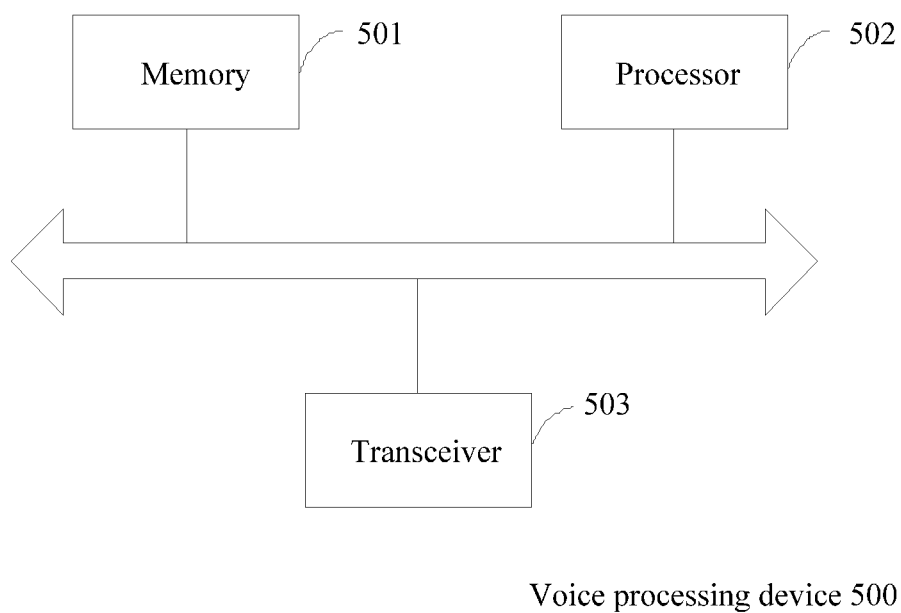
FIG. 5 is a schematic diagram of a voice processing device 500 according to an embodiment of the present application.

FIG. 5 is a schematic diagram of a voice processing device 500 according to an embodiment of the present application. The voice processing device may be a smart device such as a computer, a tablet, or a mobile phone. As shown in FIG. 5, the device includes:

a memory 501 and a processor 502, where the memory 501 is configured to store an instruction executed by the processor 502, such that the processor 502 executes the voice processing method described above.

Optionally, the device further includes: a transceiver 503, configured to achieve communications between the device 500 and other devices.

The memory 501 may be implemented by any type of volatile or non-volatile storage device, or a combination thereof, such as static random access memory (Static Random Access Memory, SRAM), electrically erasable programmable read-only memory (Electrically Erasable Programmable Read-Only Memory, EEPROM), erasable programmable read-only memory (Erasable Programmable Read-Only Memory, EPROM), programmable read-only memory (Programmable read-only memory, PROM), read-only memory (Read-Only Memory, ROM), magnetic memory, flash memory, magnetic disk or compact disk.

The processor 502 may be implemented by one or more application specific integrated circuits (Application Specific Integrated Circuit, ASIC), digital signal processors (Digital Signal Processor, DSP), digital signal processing devices (Digital Signal Processing Device, DSPD), programmable logic devices (Programmable Logic Device, PLD), field-programmable gate arrays (Field-Programmable Gate Array, FPGA), controllers, microcontrollers, microprocessors or other electronic elements.

The processor 502 is configured to perform the following method: acquiring a first acoustic feature of each of N voice frames, where N is a positive integer greater than 1; applying a neural network algorithm to N first acoustic features to obtain a first mask; modifying the first mask according to VAD information of the N voice frames to obtain a second mask; and processing the N first acoustic features according to the second mask to obtain a second acoustic feature.

Optionally, the processor 502 is further configured to calculate a product of the VAD information and the first mask to obtain the second mask.

Optionally, the VAD information includes: a VAD value corresponding to each of the voice frames. Correspondingly, the processor 502 is further configured to, when the N voice frames includes a silence frame, set a VAD value corresponding to the silence frame to zero.

Optionally, the VAD information includes: a VAD value corresponding to each of the voice frames. The processor 502 is further configured to determine M1 voice frames having a VAD value of 1 and P1 voice frames having a VAD value of 0 from the N voice frames, where the M1 voice frames are adjacent to the P1 voice frames, and where M1 and P1 are positive integers greater than 1; smoothing the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, where the M2 voice frames are adjacent to the P2 voice frames, and where $1 \leq M2 \leq M1$, $1 \leq P2 \leq P1$.

Optionally, the processor 502 is specifically configured to: determine a call type corresponding to each of the N voice frames, where the type includes silence and phone; determine a voice frame having the silence type as a voice frame having the VAD value of 0; and determine a voice frame having the phone type as a voice frame having the VAD value of 1.

Optionally, M2 and P2 are determined by a hamming window, a triangular window or a hanning window.

The present application provides a voice processing device, which may be used in the voice processing method described above. For contents and effects of the voice processing device, reference may be made to the description of the method embodiment, which is not repeated herein.

The application also provides a storage medium, including: computer executable instructions for implementing the voice processing method described above. For contents and effects of the storage medium, reference may be made to the description of the method embodiment, which is not repeated herein.

The application also provides a computer program product, including: computer executable instructions for implementing the voice processing method described above. For contents and effects of the computer program product, reference may be made to the description of the method embodiment, which is not repeated herein.

It will be understood by those skilled in the art that all or part of the steps implementing the above method embodiments may be performed by hardware associated with program instructions. The aforementioned program may be stored in a computer readable medium. When the program is executed, the steps including the foregoing method embodiments are performed; and the foregoing medium includes a medium that can store program codes, such as an ROM, an RAM, a magnetic disk, or a compact disk.

It should be noted that the above embodiments are merely used to illustrate, but are not intended to limit the technical solutions of the present application. Although the present application has been described in detail with reference to the foregoing embodiments, those skilled in the art will understand that the technical solutions described in the foregoing embodiments may be modified, or some or all of the technical features may be substituted with other equivalents, however, these modifications or substitutions do not make the essence of their corresponding technical solutions deviate from the scope of the technical solutions of the embodiments of the present application.

What is claimed is:

1. A voice processing method, comprising:
   acquiring a first acoustic feature of each of N voice frames, wherein N is a positive integer greater than 1;
   applying a neural network algorithm to N first acoustic features to obtain a first mask;
   modifying the first mask according to voice activity detection (VAD) information of the N voice frames to obtain a second mask; and
   processing the N first acoustic features according to the second mask to obtain a second acoustic feature;
   wherein the VAD information comprises a VAD value corresponding to each of the voice frames; and
   correspondingly, before the modifying the first mask according to VAD information of the N voice frames, the method further comprises:
   determining M1 voice frames having a VAD value of 1 and P1 voice frames having a VAD value of 0 from the N voice frames, wherein the M1 voice frames are adjacent to the P1 voice frames, and wherein M1 and P1 are positive integers greater than 1; and
   smoothing the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, wherein the M2 voice frames are adjacent to the P2 voice frames, and wherein $1 \leq M2 \leq M1$, $1 \leq P2 \leq P1$.

2. The method according to claim 1, wherein the modifying the first mask according to the VAD information of the N voice frames comprises:
   calculating a product of the VAD information and the first mask to obtain the second mask.

3. The method according to claim 1, wherein the determining the M1 voice frames having the VAD value of 1 and the P1 voice frames having the VAD value of 0 from the N voice frames comprise:
   determining a call type corresponding to each of the N voice frames, wherein the type comprises silence and phone;

determining a voice frame having the silence type as a voice frame having the VAD value of 0; and determining a voice frame having the phone type as a voice frame having the VAD value of 1.

4. The method according to claim 3, wherein M2 and P2 are determined by a hamming window, a triangular window or a hanning window.

5. A voice processing device, comprising:

a memory and a processor;

wherein the memory is configured to store instructions executed by the processor, such that the processor performs:

acquiring a first acoustic feature of each of N voice frames, wherein N is a positive integer greater than 1;

applying a neural network algorithm to N first acoustic features to obtain a first mask;

modifying the first mask according to voice activity detection (VAD) information of the N voice frames to obtain a second mask; and processing the N first acoustic features according to the second mask to obtain a second acoustic feature;

wherein the VAD information comprises a VAD value corresponding to each of the voice frames; and correspondingly, the processor is further configured to:

determine M1 voice frames having a VAD value of 1 and P1 voice frames having a VAD value of 0 from the N voice frames, wherein the M1 voice frames are adjacent to the P1 voice frames, and wherein M1 and P1 are positive integers greater than 1; and smooth the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, wherein the M2 voice frames are adjacent to the P2 voice frames, and wherein $1 \leq M2 \leq M1$, $1 \leq P2 \leq P1$.

6. The device according to claim 5, wherein the processor is configured to:

calculate a product of the VAD information and the first mask to obtain the second mask.

7. The device according to claim 5, wherein the processor is configured to:

determine a call type corresponding to each of the N voice frames, wherein the type comprises silence and phone;

determine a voice frame having the silence type as a voice frame having the VAD value of 0; and determine a voice frame having the phone type as a voice frame having the VAD value of 1.

8. The device according to claim 7, wherein M2 and P2 are determined by a hamming window, a triangular window or a hanning window.

9. A non-transitory storage medium, comprising: computer executable instructions for implementing following steps:

acquiring a first acoustic feature of each of N voice frames, wherein N is a positive integer greater than 1;

applying a neural network algorithm to N first acoustic features to obtain a first mask;

modifying the first mask according to voice activity detection (VAD) information of the N voice frames to obtain a second mask; and processing the N first acoustic features according to the second mask to obtain a second acoustic feature;

wherein the VAD information comprises a VAD value corresponding to each of the voice frames; and correspondingly, the computer executable instructions are further configured to implement:

determining M1 voice frames having a VAD value of 1 and P1 voice frames having a VAD value of 0 from the N voice frames, wherein the M1 voice frames are adjacent to the P1 voice frames, and wherein M1 and P1 are positive integers greater than 1; and smoothing the VAD value corresponding to M2 voice frames of the M1 voice frames and the VAD value corresponding to P2 voice frames of the P1 voice frames, such that the VAD value corresponding to the M2 voice frames and the VAD value corresponding to the P2 voice frames are changed gradually from 0 to 1 or from 1 to 0, wherein the M2 voice frames are adjacent to the P2 voice frames, and wherein $1 \leq M2 \leq M1$, $1 \leq P2 \leq P1$.

10. The non-transitory storage medium according to claim 9, wherein the computer executable instructions are configured to implement:

calculating a product of the VAD information and the first mask to obtain the second mask.

11. The non-transitory storage medium according to claim 9, wherein the computer executable instructions are configured to implement:

determining a call type corresponding to each of the N voice frames, wherein the type comprises silence and phone;

determining a voice frame having the silence type as a voice frame having the VAD value of 0; and determining a voice frame having the phone type as a voice frame having the VAD value of 1.

12. The non-transitory storage medium according to claim 11, wherein M2 and P2 are determined by a hamming window, a triangular window or a hanning window.

* * * * *